Jan. 7, 1947.   W. H. BIXBY   2,413,941
VOLTAGE REGULATION
Filed Jan. 31, 1945
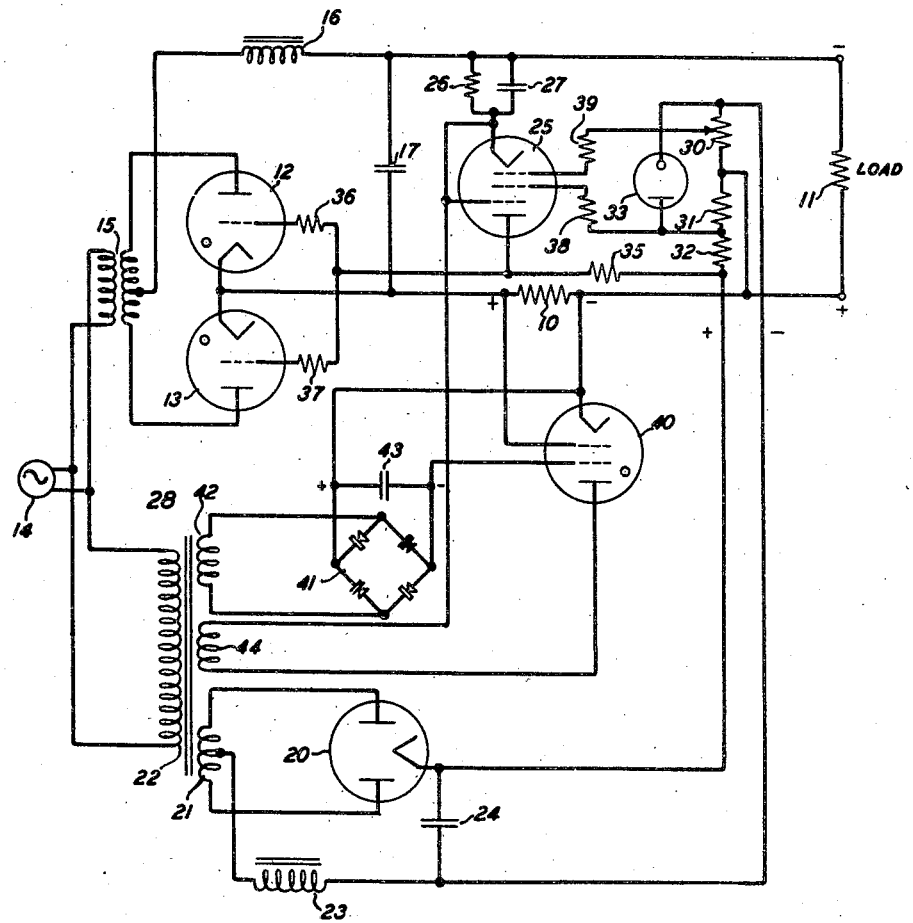
INVENTOR
W. H. BIXBY
BY
*G. F. Heuerman*
ATTORNEY Patented Jan. 7, 1947

2,413,941

UNITED STATES PATENT OFFICE 2,413,941

VOLTAGE REGULATION

William H. Bixby, Detroit, Mich., assignor to Donald R. Middleton and Stanley M. Hanley, doing business as Power Equipment Company, Detroit, Mich., a copartnership Application January 31, 1945, Serial No. 575,461

3 Claims. (Cl. 175—363)

This invention relates to voltage regulation and particularly to a regulated rectifier which is protected against overloading.

The chief object of the invention is to provide apparatus for limiting the current supplied to a load to a certain maximum amplitude and for minimizing load voltage changes when the load current is within a normal operating range below said maximum amplitude.

In accordance with a specific embodiment of the invention shown and described herein for the purpose of illustration, there is provided a rectifier including a space discharge device for supplying rectified current to a load. For controlling the current supplied to the load to minimize load voltage variations over a normal operating range of load current there is provided an electronic amplifying circuit for amplifying a voltage having variations corresponding to load voltage changes and for impressing the amplifier output voltage upon the control grid-cathode circuit of the rectifier space discharge device. There is also provided protective apparatus including a four-electrode gaseous discharge device for limiting the load current to a certain maximum value when the normal operating range of load current is exceeded as would occur, for example, if the load were accidentally short-circuited. The anode-cathode path of the gaseous discharge device is connected in a circuit comprising a source of alternating current and a resistor across the terminals of which a condenser is connected, the resistor and condenser in parallel being included in the input circuit of the amplifier circuit. The screen grid of the gaseous discharge device is biased negatively with respect to its cathode so that the device is normally non-conducting. The control grid-cathode circuit of the device is connected across a resistor in series with the load. When the load current is increased to an amplitude above the normal operating range of load current, the control grid of the gaseous tube becomes sufficiently positive with respect to the cathode due to the voltage drop across the series resistor to initiate the flow of space current in said gaseous tube to change the charge on said condenser. Due to the resulting change of voltage applied to the amplifier input circuit, there is applied to the control grid-cathode circuit of the rectifier space discharge device a biasing voltage for causing the rectified current supplied to the load to be limited to a safe maximum amplitude. The voltages applied to the gaseous discharge device are preferably such that it conducts space current during a portion only of each positive half cycle of the anode voltage when the load current has a certain amplitude which is above the normal operating amplitude range to limit the load current. Any further increase of load current is opposed or substantially prevented due to the fact that an increase of voltage applied to the control grid-cathode circuit of the gaseous discharge device causes it to conduct during a larger portion of each positive half cycle of its anode voltage, thus further changing the charge on the condenser.

The invention will now be described in greater detail by reference to the accompanying drawing, the single figure of which is a diagrammatic view of a regulated rectifier embodying the invention.

Direct current is supplied through a series resistor 10 to a load 11 from the output of a full wave rectifier comprising two gaseous, grid controlled rectifier tubes 12 and 13 to which current is supplied from alternating current supply source 14 through a transformer 15 and a ripple filter made up of a series inductance device 16 and a shunt condenser 17. There is provided an auxiliary full wave rectifier comprising space discharge device 20 to which current is supplied from a secondary winding 21 of a transformer 28 having its primary winding 22 connected to the alternating current supply source 14, and a ripple filter made up of a series inductance element 23 and a shunt condenser 24. Amplifier space discharge tube 25 having an anode, a cathode, a control grid, a screen grid, and a suppressor grid has its anode-cathode path connected in a series circuit which may be traced from the cathode, through resistor 26, having condenser 27 connected in parallel therewith, rectifier 12, 13, resistor 10, potentiometer 30, rectifier 20, and resistor 35 to the anode of tube 25, the voltages of rectifier 12, 13 and rectifier 20 being in aiding relationship in the circuit. Due to the flow of space current in this circuit, the condenser 27 becomes charged to a certain voltage in a direction such that the condenser plate connected to the cathode of tube 25 is positive with respect to the other condenser plate. The anode of tube 25 is connected to the control grids of rectifier tubes 12 and 13 through grid resistors 36 and 37 respectively so that the amplifier output voltage is impressed upon the grid-cathode circuits of tubes 12 and 13.

The rectifier 20 supplies current to a circuit comprising potentiometer 30, resistor 31, and resistor 32 connected in series, a cold cathode, gas-filled voltage regulator tube 33 being connected across potentiometer 30 and resistor 31 in series.

The resistance of the voltage regulator tube decreases as the current flowing through it increases at a rate to maintain the voltage across its terminals substantially constant. There is applied to the screen grid of tube 25 a potential which is positive with respect to the cathode potential by connecting the screen grid through a resistor 38 to the common terminal of resistors 31 and 32. The control grid of tube 25 is connected to the adjustable contact of potentiometer 30 through a resistor 39.

It will be seen that the resultant voltage in the circuit connecting the control grid and cathode of tube 25 has three components, viz., the voltage across condenser 27 and resistor 26 in parallel, the load voltage and a substantially constant voltage across a portion of potentiometer 30, the polarity of the load voltage being in opposition to the remaining voltage components. If an increase in load voltage occurs, due to an increase in line voltage or to a decrease of load, for example, the control grid of amplifier tube 25 will become relatively more positive or less negative with respect to its cathode to cause increased space current to flow through resistor 35. The control grids of rectifier tubes 12 and 13 are thus made relatively more negative or less positive with respect to their cathodes to reduce the load current and thus cause the load voltage to be maintained substantially constant at its normal operating value.

For protecting the rectifier 12, 13 against excessive load current there is provided a protective circuit comprising a four-electrode gaseous discharge device 40. The cathode of this tube is connected to the negative terminal of resistor 10 and its control grid is connected to the positive terminal of resistor 10. The screen grid of the tube is maintained at a negative potential with respect to the cathode by connecting the screen grid and cathode to the terminals respectively of a bridge rectifier 41 to which current is supplied from a secondary winding 42 of transformer 28. A condenser 43 is connected across the terminals of the rectifier. The anode-cathode circuit of tube 40 may be traced from the anode, through a secondary winding 44 of transformer 28, condenser 27 shunted by resistor 26, condenser 17 and resistor 10 to the cathode.

When the load current is in excess of the normal operating current range, the voltage drop across resistor 10 is sufficiently high to cause the tube 40 to pass space current intermittently during a portion at least of each positive half cycle of the anode voltage from transformer 44. As a result the condenser 27 discharges, and it may be charged in the reverse direction, and the condenser plate connected to the cathode of tube 25 becomes relatively less positive, or possibly negative, with respect to the opposed plate. The control grid of tube 25 thus becomes relatively less negative with respect to its cathode and the control grids of the rectifier tubes 12 and 13 become relatively more negative with respect to their cathodes, thus tending to reduce the load current to prevent it from rising above a safe maximum amplitude. When the load current is subsequently reduced to an amplitude within the normal operating range, the space current through tube 40 is interrupted at the end of a positive half cycle of anode voltage and the voltage drop across resistor 10 is then insufficient to cause the tube to conduct space current during a succeeding positive half cycle.

Performance data for a circuit of the type shown and described is as follows: With the line voltage held constant at 115 volts, when the load resistance is decreased in steps, the load current increased to the following amplitudes: 1.0; 3.0; 6.1; 9.1; 12.6; 12.7; 13.1; 13.2 and 13.9 amperes. The corresponding values of load voltage were, respectively, 30; 30; 29.8; 29.4; 28.8; 22; 13; 7.6 and zero volts. The circuit will recover its voltage with increasing load resistance in substantially the same fashion as it drops. The protective circuit in no way affects the operation of the rectifier for loads below a critical value. For loads above this critical value, the load voltage is reduced rapidly as the load resistance is decreased.

What is claimed is:

1. The combination with means for supplying current from a direct current source to a load and for maintaining the load voltage substantially constant over a normal operating range of load current, of a resistor in the supply circuit in series with the load, a gaseous space discharge device having an anode, a cathode, a control grid and a screen grid, means for biasing said screen grid negatively with respect to said cathode, means for connecting said control grid to the positive terminal of said resistor, means for connecting said cathode to the negative terminal of said resistor, a circuit connecting said anode and said cathode, a source of alternating voltage in said circuit, said discharge device becoming conducting intermittently when the load current is greater than the current amplitudes within the normal operating range, and means responsive to the current flowing in said circuit when said device is conducting for preventing a rise of load current above a certain maximum amplitude.

2. A regulated rectifier comprising space discharge rectifying means for supplying rectified current to a load, said rectifying means having control means upon which a voltage may be impressed for controlling the current supplied to said load, a resistor in said supply circuit in series with said load, a space discharge amplifier having an input circuit and an output circuit, means for connecting the output circuit of said amplifier to the control means of said space discharge rectifying means for impressing thereon a voltage for controlling the current supplied to the load, means for impressing upon the input circuit of said amplifier a voltage having variations corresponding to load voltage variations for causing said rectifying means to be controlled to minimize said load voltage variations, an auxiliary space discharge rectifying device having an anode, a cathode and a control electrode, a circuit connecting the anode and cathode of said auxiliary device comprising a source of alternating voltage and impedance means the voltage across which is controlled due to the current flowing in said anode-cathode circuit, said impedance means being a part of the input circuit in said amplifier, and means for impressing the voltage drop across said resistor upon the control grid-cathode path of said auxiliary device to cause it to conduct space current intermittently whenever the load current has an amplitude greater than the normal operating amplitude range, thereby producing a voltage drop across said impedance means for controlling said amplifier and thereby causing said rectifying means to be controlled to limit the load current to a certain maximum amplitude.

3. A rectifier for supplying rectified current to a load comprising electronic means responsive to load voltage changes for controlling said rectifier to minimize said load voltage changes over a normal operating range of load current, a resistor in series with said load, a gaseous discharge device having an anode, a cathode, and a control electrode, an anode current path for said device comprising a source of alternating voltage, means for impressing the potential difference across said resistor upon the control electrode-cathode path of said device to cause anode current to flow therein intermittently whenever the load current flowing through said resistor exceeds a certain amplitude, and means responsive to said anode current for controlling said electronic device to cause the current supplied by said rectifier to said load to be limited to a desired safe maximum value.

WILLIAM H. BIXBY.